May 30, 1961
H. S. HUGHES
2,986,525
REFRIGERANT ABSORBENT COMPOSITION AND
METHOD OF PRODUCING SAME
Filed April 16, 1958
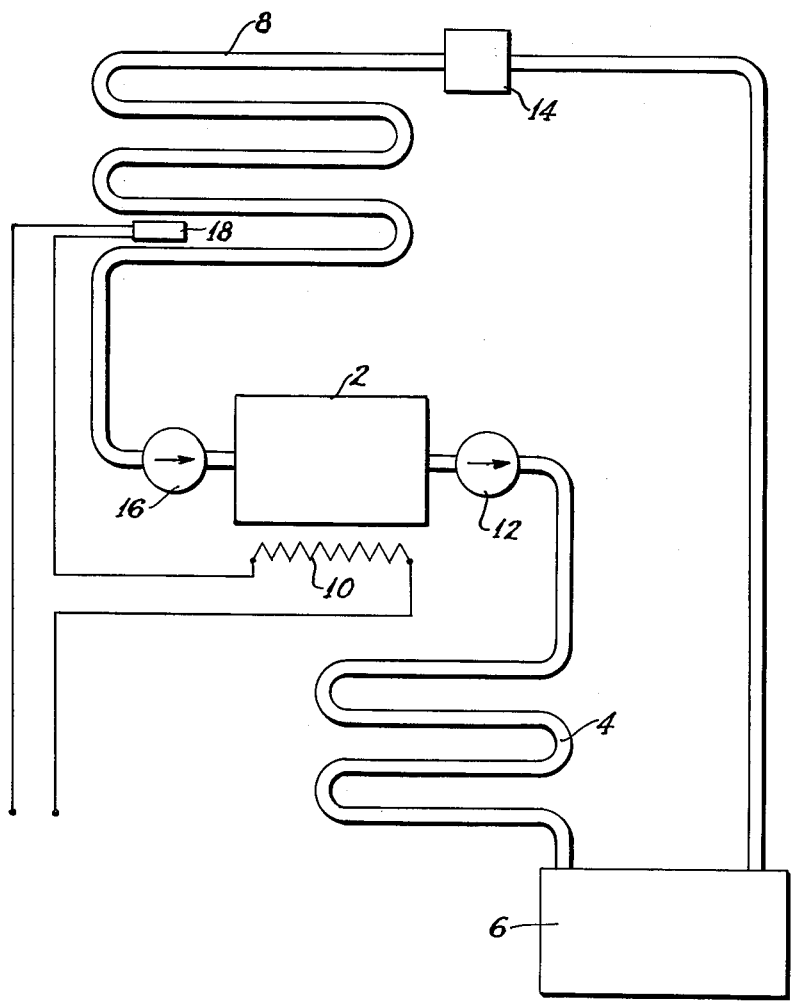
HUGH S. HUGHES
*INVENTOR.*
BY *Albert Sperry*
*ATTORNEY*

United States Patent Office 2,986,525
Patented May 30, 1961

2,986,525
REFRIGERANT ABSORBENT COMPOSITION AND METHOD OF PRODUCING SAME
Hugh S. Hughes, 758 Fahs St., York, Pa.
Filed Apr. 16, 1958, Ser. No. 728,860
9 Claims. (Cl. 252—67)

This invention relates to absorption type refrigeration and is directed particularly to compositions employed as absorbents or adsorbents and methods of producing and using the same.

It has been common practice heretofore to employ mixtures of various salts as absorbents or adsorbents in the generators of absorption type refrigeration equipment. A great variety of such salts have been suggested for use including particularly those alkali or alkaline earth metal salts capable of combining with gaseous ammonia to form amines or amino compounds or complexes.

While such compositions are generally very efficient absorbents or adsorbents when first installed in a generator they tend to deteriorate on usage by reason of the repeated expansion and contraction thereof with discharge and absorption of ammonia when heated and cooled. As a result, the salt mixtures of the prior art ultimately may be broken down into small pieces or granules which have reduced absorption properties and tend to obstruct the ingress and egress of the refrigerant gas impairing the operation of the equipment.

I have discovered that the tendency for salt mixtures to deteriorate on usage is eliminated or reduced, and compositions having improved physical properties are obtained provided the salts employed are first fused together so as to produce a composition hereinafter referred to as a eutectoid. The fused product thus obtained generally has a melting point below that of the higher melting constituent of the mixture and its melting point may be below that of any of its constituents. In any event, the intimacy of the mixture of salts and the physical properties of the product obtained as a result of such fusion are greatly improved.

If desired, other agents may be added to the fused salts before or after fusion thereof to further immprove or modify the physical or absorbing characteristics thereof.

The fused mixture of salts, after cooling and solidifying, is preferably ground to a small size. It is then introduced into a "generator" or "boiler," after which it is subjected to the action of ammonia or other refrigerant gas to be used whereby the desired amine or amino complexes are formed in the generator. Generators thus charged may be used in any conventional or preferred manner for releasing and absorbing refrigerant gas in absorption type refrigerating equipment. However, the eutectoid produced as described above is characterized by its strength and stability in that it does not break down or deteriorate upon long continued use and after repeated heating and cooling thereof. It remains instead in the form of a strong porous mass which does not require the usual dividers and internal supports in the generator for holding the eutectoid in place.

The principal object of the present invention is to provide a new composition adapted for use as an absorbent or adsorbent for refrigerant gas.

Another object of the invention is to provide novel methods for producing absorbents or adsorbents for refrigerant gas.

A further object of the invention is to provide absorbents or adsorbents for refrigerant gas having improved physical properties.

Another object of the invention is to provide improved generators or boilers for use in absorption type refrigeration equipment.

These and other objects and features of the present invention will appear from the following description thereof wherein typical and preferred compositions and methods of producing the same are cited by way of illustration and in order to indicate the nature of the invention but without intending to limit the scope of the invenion thereby.

A typical refrigeration system embodying the present invention is illustrated diagrammatically in the single figure of the drawing.

The salts employed in producing absorbent or adsorbent compositions embodying the present invention may be any of those heretofore known and used for the absorption and release of refrigerant gas. In particular when the refrigerant gas is ammonia as preferred, the salts are those which combine readily with ammonia to form amines or amino compounds or complexes and which are capable of giving up the ammonia readily upon the application of heat thereto or upon a reduction in the pressure applied to the composition. Typical of such salts are the halides of the alkaline earth metals and various nitrates and chlorides such as lithium and ammonium nitrate or chloride.

The compositions of the present invention may further contain additional agents which serve as modifiers to improve the physical properties of the composition or to increase or alter the rate and amount of refrigerant gas absorbed and given up thereby. Among such additives may be mentioned carbon black, activated charcoal, silica gel, activated alumina, iron oxide, clay, and the like.

In preparing compositions in accordance with the present invention, anhydrous salts are used and they are mixed and fused together with or without the added agents. It is preferable to carry on the fusion in a non-contaminating vessel, such as a nickel or ceramic crucible. During such fusion, the liquified salts are intimately blended together. In fact it would appear that the salts are probably mutually dissolved one in the other, or are otherwise associated in some novel manner, since the melting point of the mixed salts generally differs from that of any of its components. It is for this reason that the composition is preferably referred to as a eutectoid, although the salts need not be proportioned to develop the lowest possible melting point of the combination of salts used.

When an additive or modifying agent is used in the composition, it generally is mixed with the salts while they are in a fused condition and is thereby uniformly distributed and intimately blended therewith.

After fusion, the mixture of salts is cooled and broken up or ground to small particles so as to present an extended surface area for contact with the ammonia or other refrigerant gas. The granular size may vary from about 10 to 200 mesh, although a fineness of about 50 to 100 mesh is preferred.

Since the eutectoid is hydroscopic and the elimination of moisture from gas generators used in refrigeration equipment is desirable, the pulverized eutectoid is preferably charged into a generator or other closed casing without delay. In fact the grinding or pulverizing of the eutectoid may be carried out under reduced pressure, or in the presence of a dry inert gas, or at an elevated temperature such as to prevent the moisture from being absorbed by the granulated material. Similarly, the generator or casing may be heated or evacuated to reduce the moisture content thereof to a minimum before the eutectoid is introduced therein.

The charge of eutectoid placed in the generator is generally no more than sufficient to occupy about one half the capacity of the generator. Thereafter ammonia or the refrigerant gas to be used is passed into the generator and into contact with the eutectoid. The ammonia, upon contact with the eutectoid, causes the particles to swell and form a highly porous and substantially rigid or solidified sponge presenting enormous surface area. The ammonia is taken up and held by the mass due to absorption or adsorption thereof by the eutectoid. The volume of the treated eutectoid is approximately double that of the untreated fused salts, with the result that the generator is substantially filled by the porous body and its walls may even be subjected to pressure by the expanding material. The reaction which takes place on introduction of the ammonia and during swelling of the eutectoid is exothermic and may reach a temperature of 180° C. The amount of ammonia taken up and held by the eutectoid may equal the weight of the fused salt mixture or be as low as one fourth the weight of the salts, depending upon the composition and proportions of the salts employed in producing the eutectoid.

The rate of absorption of the ammonia by the pulverized eutectoid will vary somewhat with the composition of the eutectoid and the pressure of the gas being passed into contact therewith. The initial contact of ammonia with the eutectoid over a period of a few seconds is sufficient to expand the fused salts to substantially their full volume. The composition is thereby converted into a solidified sponge-like mass which does not change its shape or condition upon subsequent repeated liberation and reabsorption of ammonia. Thereafter, absorption or adsorption of the ammonia and further swelling, if any, may take place over a period of several minutes.

Upon conclusion of the treatment, the generator is substantially or completely filled with a strong, highly porous mass which does not require the use of dividers or internal supports in the generator for holding the ammoniated eutectoid in place. It may be subjected to repeated charging and discharging by cooling and heating or by the application of suction and pressure thereto in the usual manner employed in utilizing generators or boilers in absorption type refrigeration. The compositions embodying the present invention do not tend to break down into "popcorn" or granules or deteriorate on long continued usage. The composition instead retains its strong, firm, sponge-like condition even after long continued, repeated usage.

The presence of additives or modifiers in the eutectoid further appears to alter the nature of the association of the constituents of the eutectoid and to improve its properties. Thus the addition of carbon black or iron oxide to the molten salts appears to alter the character of the crystal structure since upon grinding the cooled and hardened eutectoid, sharper edges, corners and surfaces are developed. Moreover, the swollen composition containing carbon black or iron oxide possesses greater hardness and compression strength than does a similar composition containing no such additive. Other additives may serve as adsorbents to increase the adsorption capacity or to alter the rate of absorption or release of ammonia in charging and discharging the generator.

The absorption capacity of the generator and the rate at which it absorbs and releases ammonia varies considerably depending upon the composition of the eutectoid. In the preferred composition, the salts employed are strontium chloride and lithium nitrate. The proportions of these salts may vary over a wide range from, say, 90% strontium chloride and 10% lithium nitrate to, say, 20% strontium chloride and 80% lithium nitrate. A preferred composition contains about 75% by weight of strontium chloride and about 25% of lithium nitrate.

In general, the strongest eutectoids and those having the greatest compression and tensile strength contain larger amounts of strontium chloride. The absorption capacity of the eutectoid also is greater when the strontium chloride predominates in the composition. However, the composition of the eutectoid may be selected to meet the particular conditions to which the equipment is to be subjected.

In those units designed for use in air conditioners for automobiles wherein space is at a premium but resistance to vibration is also important, the use of additives such as carbon black, iron oxide, silica gel, or activated alumina is advantageous. The amount of such additives used may range from about 2 to 10% of the total mixture, and the proportions of the salts employed in the eutectoid may be adjusted to assure adequate durability and effective life consistent with the necessary absorption capacity.

In order to illustrate typical procedure in accordance with the present invention, the following example is cited: 75 parts by weight of anhydrous strontium chloride and 25 parts by weight of anhydrous lithium nitrate are pulverized and thoroughly mixed together. The mixture is then heated until fusion takes place. While the melting point of anhydrous strontium chloride is 873° C. and that of anhydrous lithium nitrate is 255° C, the mixture will become liquid at a temperature of about 817° C. The heating may be continued further if desired to insure complete and intimate mixing of the constituents but heating above about 825° to 850° C. is not necessary and does not appear to serve any useful purpose.

To the liquid mixture there is added 5 parts by weight of carbon black or iron oxide and after stirring to assure intimate mixing thereof, the fused salts are allowed to cool and solidify. The eutectoid thus obtained is maintained in a dry atmosphere and is broken up or ground to a fineness of about 100 mesh while still maintaining it in a dry atmosphere.

The container which is to serve as a generator or boiler for refrigerating equipment is preferably heated to expel moisture and is evacuated prior to charging to assure a dry atmosphere therein. It is then filled to approximately one half its capacity with the granulated or pulverized eutectoid.

Gaseous ammonia is then admitted into the charged generator at room temperature and at a pressure of about 300 pounds per square inch. The eutectoid particles immediately swell or expand as the ammonia is absorbed or combined therewith to form the amines or amino compounds. As a result, the eutectoid is converted into a solid, strong, porous body which substantially fills the generator. The introduction of ammonia into the generator and into contact with the eutectoid preferably is continued until the eutectoid has absorbed or combined with about one half its weight of ammonia. This treatment generally only requires a short time, say 2 to 10 minutes, but the application of ammonia may be continued for a period of several hours if desired to assure complete conversion of all of the salts into amino or other expanded compounds in the composition.

The temperature of the eutectoid rises as ammonia is absorbed or adsorbed thereby and, accordingly, the generator may be cooled during the charging period and until it reaches room temperature.

The charged generator is then in condition to be incorporated in a refrigerating system or it may be sealed for storage until applied to the equipment with which it is to be used.

When included in a refrigerating system such as that shown in the drawing, the generator 2 is connected in series with a condenser 4, a receiver 6 and an evaporator 8. The generator 2 is provided with a heating element 10 which, when energized, causes ammonia gas to be evolved from the eutectoid. This gas passes to the condenser 4 through a check valve 12 and thence to the receiver 6. The condensed gas from receiver 6 is supplied to the evaporator 8 through a capillary, expansion valve or other restrictor 14 for expansion to refrigerate or cool the air adjacent the evaporator.

After a suitable period of heating, the evaporator is allowed to cool and the pressure within the generator 2 is thereby reduced. Refrigerant gas expanded in the evaporator 8 thereupon returns to the generator 2 through a check valve 16 and is reabsorbed by the cooled eutectoid for subsequent liberation in a succeeding refrigerating cycle.

The operations of heating cooling the generator may be controlled by a thermostat 18 or the like located adjacent the evaporator 8 or elsewhere so that the equipment may be automatically operated to maintain a desired temperature in an area to be cooled. However, the equipment may be operated in any other suitable way to attain the desired result.

Instead of heating and cooling the generator to cause discharge and absorption of the gaseous ammonia, it may be subjected to suction and pressure by means of a pump or otherwise in carrying out the cycle.

Compositions embodying the present invention, and generators and equipment in which the eutectoid are employed, may be varied as desired. The compositions are thus of general application and can be used in any and all types of absorption refrigeration equipment. In fact the strong, durable nature of the eutectoid renders it useful in many types of equipment wherein absorption refrigerating means have not been suitable heretofore. The long life and shock resistance of the eutectoid compositions of the present invention render them particularly useful in remote and unattended installations and in automobiles, aircraft, and railroad equipment wherein continued vibration is a problem. At the same time, the relatively small size of the generator required for many purposes permits use of the invention in ice cream and beverage coolers intended for picnic use and elsewhere. The invention is nevertheless equally useful in large installations for air conditioning or cooling theatres, office buildings, packing houses and industrial installations.

In view of the varied uses and applications of the present invention, it should be understood that the particular compositions and methods of production described above and the type of refrigerating system in which the invention may be employed have been cited for purposes of illlustration only and are not intended to limit the scope of the invention.

I claim:

1. A composition for use in the generator of absorption type refrigeration equipment comprising a fused and granulated mixture of anhydrous salts containing from about 20 to 90% of a salt selected from the group consisting of the halides of the alkaline earth metals and from about 10 to 80% of a salt selected from the group consisting of the nitrates and chlorides of lithium and ammonia.

2. A composition for use in the generator of absorption type refrigeration equipment comprising a fused and granulated mixture of anhydrous salts containing from about 20 to 90% of a salt selected from the group consisting of the halides of the alkaline earth metals and from about 10 to 80% of a salt selected from the group consisting of the nitrates and chlorides of lithium and ammonia to which has been added a modifier selected from the group consisting of charcoal, carbon black, silica gel, activated alumina, iron oxide and clay.

3. The method of preparing an absorbent for ammonia which comprises the steps of mixing together anhydrous salts containing from about 20 to 90% of a salt selected from the group consisting of the halides of from about 10 to 80% of a salt selected from the group consisting of the alkaline earth metals and the nitrates and chlorides of lithium and ammonia, fusing said mixture and thereafter granulating the fusion product.

4. The method of preparing an absorbent for ammonia which comprises the steps of mixing together anhydrous salts containing from about 20 to 90% of a salt selected from the group consisting of the halides of from about 10 to 80% of a salt selected from the group consisting of the alkaline earth metals and the nitrates and chlorides of lithium and ammonia, fusing said mixture, adding up to 10% by weight of a modifier selected from the group consisting of charcoal, carbon black, silica gel, activated alumina, iron oxide and clay, and thereafter granulating the fusion product.

5. A eutectoid comprising from about 10 to 90% by weight of strontium chloride and from about 90 to 10% by weight of lithium nitrate in a fused and granulated condition.

6. A composition for use in a generator of absorption type refrigeration equipment comprising a fused and granulated material containing about 75% by weight of strontium chloride and 25% by weight of lithium nitrate.

7. The composition of claim 6 which also contains about 5% by weight of carbon black.

8. The method of producing a eutectoid which comprises mixing about 75 parts by weight of anhydrous strontium chloride with about 25 parts by weight of lithium nitrate, fusing the mixture thus produced, cooling the fusion product and granulating it to a fineness of about 100 mesh.

9. The method as set forth in claim 8 wherein about 5 parts by weight of carbon black are mixed with the fused salts prior to cooling and granulation of the fusion product.

References Cited in the file of this patent

UNITED STATES PATENTS

| | | |
|---|---|---|
| 1,491,510 | Bellis | Apr. 22, 1924 |
| 1,791,515 | Smith | Feb. 10, 1931 |
| 2,019,356 | Normelli | Oct. 29, 1935 |
| 2,326,130 | Kleen | Aug. 10, 1943 |